United States Patent
Cho

(10) Patent No.: US 10,107,357 B2
(45) Date of Patent: Oct. 23, 2018

(54) DYNAMIC DAMPER FOR DRIVE SHAFT FOR AUTOMOBILE

(71) Applicant: Hyundai Motor Company, Seoul (KR)

(72) Inventor: Jae-Wan Cho, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 187 days.

(21) Appl. No.: 15/147,313

(22) Filed: May 5, 2016

(65) Prior Publication Data
US 2017/0167568 A1 Jun. 15, 2017

(30) Foreign Application Priority Data
Dec. 14, 2015 (KR) .......................... 10-2015-0178015

(51) Int. Cl.
*F16F 7/10* (2006.01)
*F16F 15/14* (2006.01)

(52) U.S. Cl.
CPC ............ *F16F 15/1407* (2013.01); *F16F 7/10* (2013.01); *F16F 15/1428* (2013.01); *F16F 2222/08* (2013.01); *F16F 2228/04* (2013.01); *F16F 2232/02* (2013.01); *Y10T 464/50* (2015.01)

(58) Field of Classification Search
CPC ...... F16F 7/10; F16F 15/1407; F16F 2222/08; F16F 2228/04; F16F 2232/02; Y10T 464/50

USPC ................... 464/180; 267/141; 188/378–380
See application file for complete search history.

(56) References Cited

U.S. PATENT DOCUMENTS

| 2,948,129 | A | * | 8/1960 | Troyer | ...................... F16D 3/76 464/180 X |
| 5,056,763 | A | | 10/1991 | Hamada et al. | |
| 6,513,801 | B1 | | 2/2003 | McCarthy | |
| 6,682,060 | B2 | * | 1/2004 | Kato | ................... F16F 15/1442 267/141 |
| 6,857,623 | B2 | | 2/2005 | Kuwayama | |

FOREIGN PATENT DOCUMENTS

| JP | 1997-089047 | 3/1997 |
| JP | 2953151 B2 | 9/1999 |
| JP | 2009-250395 A | 10/2009 |
| KR | 10-2013-0039598 | 4/2013 |
| KR | 10-1526981 | 6/2015 |

* cited by examiner

*Primary Examiner* — Greg Binda
(74) *Attorney, Agent, or Firm* — Mintz Levin Cohn Ferris Glovsky and Popeo, P.C.; Peter F. Corless

(57) ABSTRACT

A dynamic damper mounted on a drive shaft for a vehicle is provided. The dynamic damper includes variations in thicknesses for each portion of a bridge portion. Further, the bridge portion is disposed between a main body portion into which a mass body is inserted and a connecting portion into which a drive shaft is insert.

6 Claims, 6 Drawing Sheets

RELATED ART
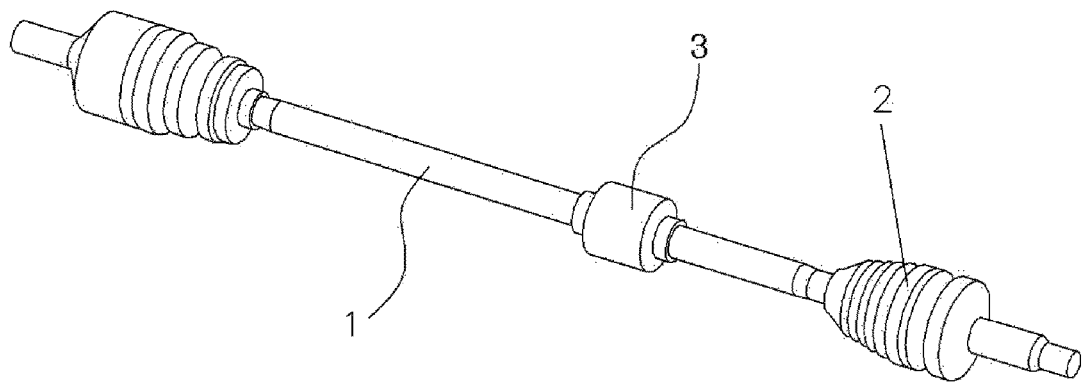
FIG. 2A
RELATED ART
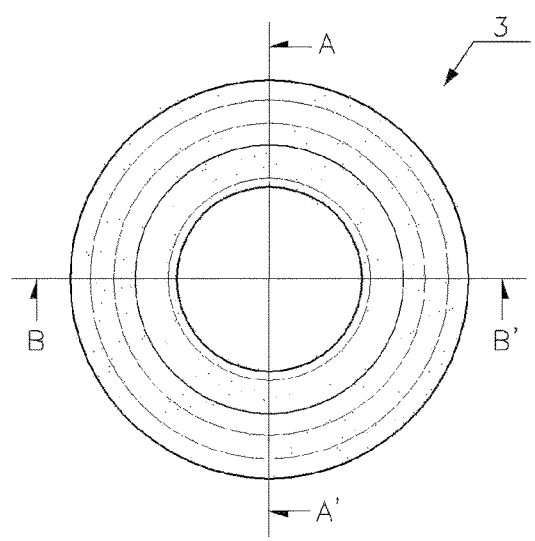

RELATED ART
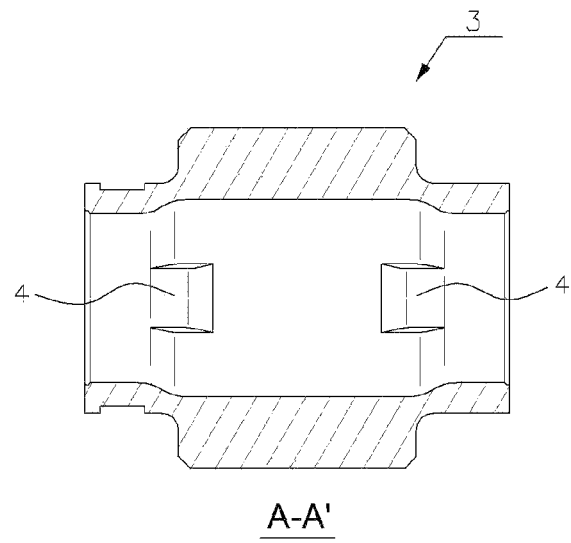
A-A'
FIG. 2C
RELATED ART
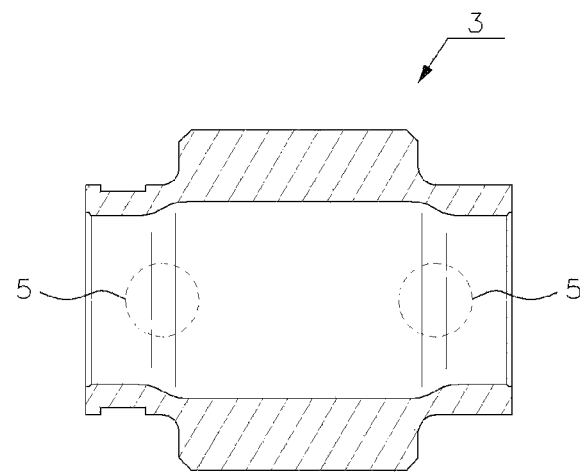
B-B'

C-C'

D-D'

DYNAMIC DAMPER FOR DRIVE SHAFT FOR AUTOMOBILE

CROSS-REFERENCE TO RELATED APPLICATIONS

This application claims priority under 35 U.S.C. § 119 to Korean Patent Application No. 10-2015-0178015, filed on Dec. 14, 2015, in the Korean Intellectual Property Office, the disclosure of which is incorporated herein by reference in its entirety.

BACKGROUND

1. Field of the Invention

The present invention relates to a dynamic damper mounted on a drive shaft for an vehicle, and more particularly, to a dynamic damper characterized by varying thicknesses for each portion of a bridge portion formed between a main body portion into which a mass body is inserted and a connecting portion into which a drive shaft is inserted.

2. Description of the Related Art

Generally, a drive shaft is installed between a transmission and wheels of a vehicle and transmits driving power from an engine to the drive shaft through the transmission, thereby driving the wheels. In particular, vibration and noise are generated when unstable steering occurs due to a frictional force and a difference in the number of rotations between the left and right wheels during a process of transmitting driving power from the engine to the wheels of the vehicle. Therefore, as illustrated in FIG. 1, when a differential driving device adjusts the number of rotations of the left and right wheels to provide steering stability, a constant velocity joint 2 is disposed between the drive shaft and the transmission, and a dynamic damper 3 is mounted on a drive shaft 1 to attenuate vibration and noise.

The dynamic damper is mounted directly on or inserted into the drive shaft, and generates a predetermined resonant frequency to absorb or eliminate (e.g., reduce) vibrational energy transmitted to the drive shaft, thereby performing a function of attenuating vibration and noise. Typically, the dynamic damper includes a cylindrical rubber damper coupled directly to an exterior circumferential surface of the drive shaft, and a mass damper which is inserted into the rubber damper and has a steel ring shape. The rubber damper transmits vibration generated from the drive shaft to the mass damper, and the mass damper receives vibration and vibrates while absorbing natural vibration of the drive shaft, thereby reducing vibration and noise of the drive shaft. However, the dynamic damper in the related art does not prevent the occurrence of anti-resonance due to a low damping value.

Therefore, to prevent the anti-resonance, a dual mode dynamic damper has been used in which as illustrated in a side view of the damper in FIG. 2A. For example, a cross-sectional view of FIG. 2B taken along line A-A', spline parts 4 illustrates a protruding wedge shape formed on a bridge portion between fixing portions between the mass damper of the dynamic damper 3 and the drive shaft when viewing a longitudinal section of the damper 3. Further, as illustrated in a cross-sectional view of FIG. 2C taken along line B-B', the spline part is not formed (for convenience, referred to as a 'non-spline part 5') when viewing a cross section of the damper 3, for example, two resonant frequencies are generated by both of the spline part 4 and the non-spline part 5, thereby eliminating anti-resonance. However, the dual mode dynamic damper attenuates the anti-resonance, but has a limitation in attenuating vibration applied to the drive shaft because of a temperature variation by which a resonant frequency of the dynamic damper varies based on the seasons.

The above information disclosed in this section is merely for enhancement of understanding of the background of the invention and therefore it may contain information that does not form the prior art that is already known in this country to those of ordinary skilled in the art.

SUMMARY

The present invention provides a dynamic damper for a drive shaft, which attenuates the anti-resonance and improves the attenuation performance regardless of a variation in resonant frequency of the dynamic damper based on a temperature variation.

An exemplary embodiment of the present invention provides a dynamic damper for a drive shaft for a vehicle that may include different thicknesses for each segment of a bridge portion formed between a main body portion into which a mass body may be inserted therein and a connecting portion into which a drive shaft may be inserted therein.

In some exemplary embodiments, the dynamic damper for a drive shaft for a vehicle may include a variation in the thicknesses of each portion of a circumferential surface of the bridge portion of the damper. For example, the damper may have a resonant frequency based on a rate of change of the resonant frequency within a predetermined temperature variation section. Therefore, the anti-resonance may be reduced, thereby reducing the attenuation of the vibration applied to a drive shaft, and maximizing an effect of attenuating vibration of the damper.

BRIEF DESCRIPTION OF THE DRAWINGS

The above and other objects, features and other advantages of the present invention will be more clearly understood from the following detailed description taken in conjunction with the accompanying drawings, in which:

FIG. 1 is an exemplary view illustrating a state in which a typical dynamic damper for a drive shaft is installed in accordance with the related art;

FIG. 2A is an exemplary side view of a dual mode dynamic damper in accordance with the related art;

FIG. 2B is an exemplary cross-sectional view taken along line A-A' of FIG. 2A in accordance with the related art;

FIG. 2C is an exemplary cross-sectional view taken along line B-B' of FIG. 2A in accordance with the related art;

DETAILED DESCRIPTION

Figure 3:
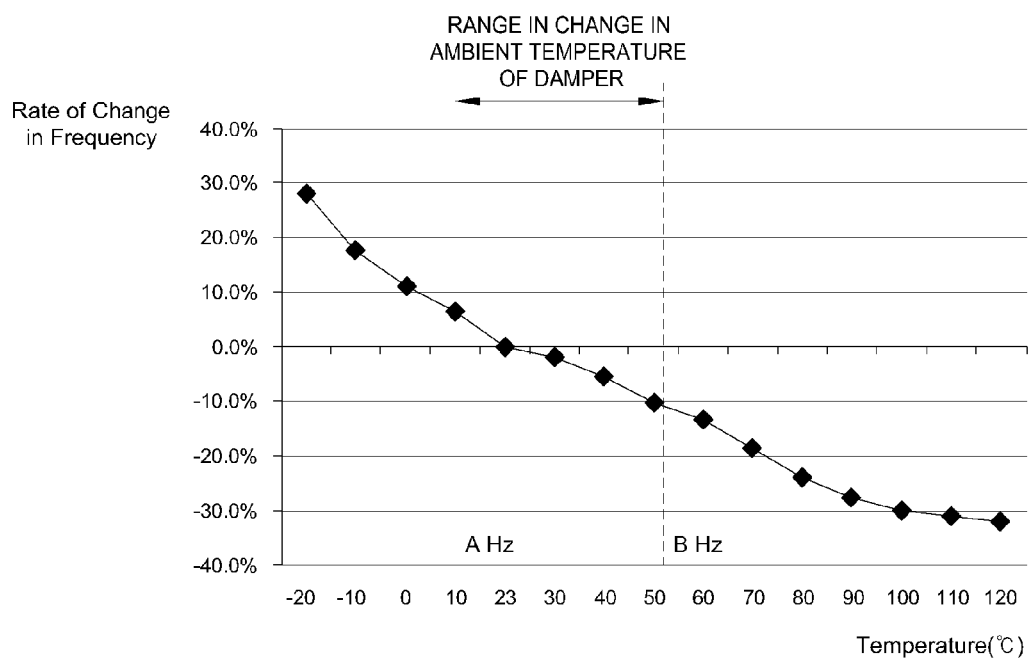
FIG. 3 is an exemplary graph illustrating a rate of change in vibration frequency of a damper in accordance with a temperature variation according to an exemplary embodiment of the present invention.

Hereinafter, a configuration of a dynamic damper for a drive shaft for a vehicle according to the present invention will be described with reference to the drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Wherever possible, the same reference numbers will be used throughout the drawings to refer to the same or like parts.

Unless there are other definitions, the terminologies used in the specification of the present invention have the meanings that a person with ordinary skill in the technical field to which the present invention pertains typically understand, and in the following description and the accompanying drawings, a detailed description of publicly known functions and configurations will be omitted so as to avoid unnecessarily obscuring the subject matter of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A dynamic damper for a drive shaft in accordance with an exemplary embodiment may be characterized by a thicknesses of a circumferential surface of a bridge portion of the damper that may differ for each portion. In particular, the damper may have a continuous resonant frequency. The dynamic damper may provide a range of a resonant frequency based on a temperature variation in an ambient atmosphere, and will be described below with reference to the drawings.

FIG. 3 is an exemplary graph illustrating a rate of change in vibration frequency of the damper according to a temperature variation. Referring to the graph, for example, a section where a temperature at the periphery of the damper may change from about 10° C. to 50° C. may include a section where a rate of change in resonant frequency of the damper changes from about +8% to −10%. For example, in the case of the dynamic damper according to the present invention, the thicknesses of the circumferential surface of the bridge portion of the damper may be set differently for each portion.

In particular, the damper may have a resonant frequency dependent on a rate of change in resonant frequency within the section where the temperature varies from about 10° C. to 50° C. In other words, the dynamic damper may have a continuous resonant frequency between a resonant frequency A Hz of the damper at a point of a temperature of about 10° C. and a resonant frequency B Hz of the damper at a point of a temperature of about 50° C. Therefore, the dynamic damper may be designed to have a resonant frequency dependent on a temperature at the periphery of the damper, and may be configured to be adjust a resonant frequency of the dynamic damper based on a temperature variation. In particular, the vibration applied to a drive shaft may be limited, and may increase an effect of vibration attenuation.

Figure 4:
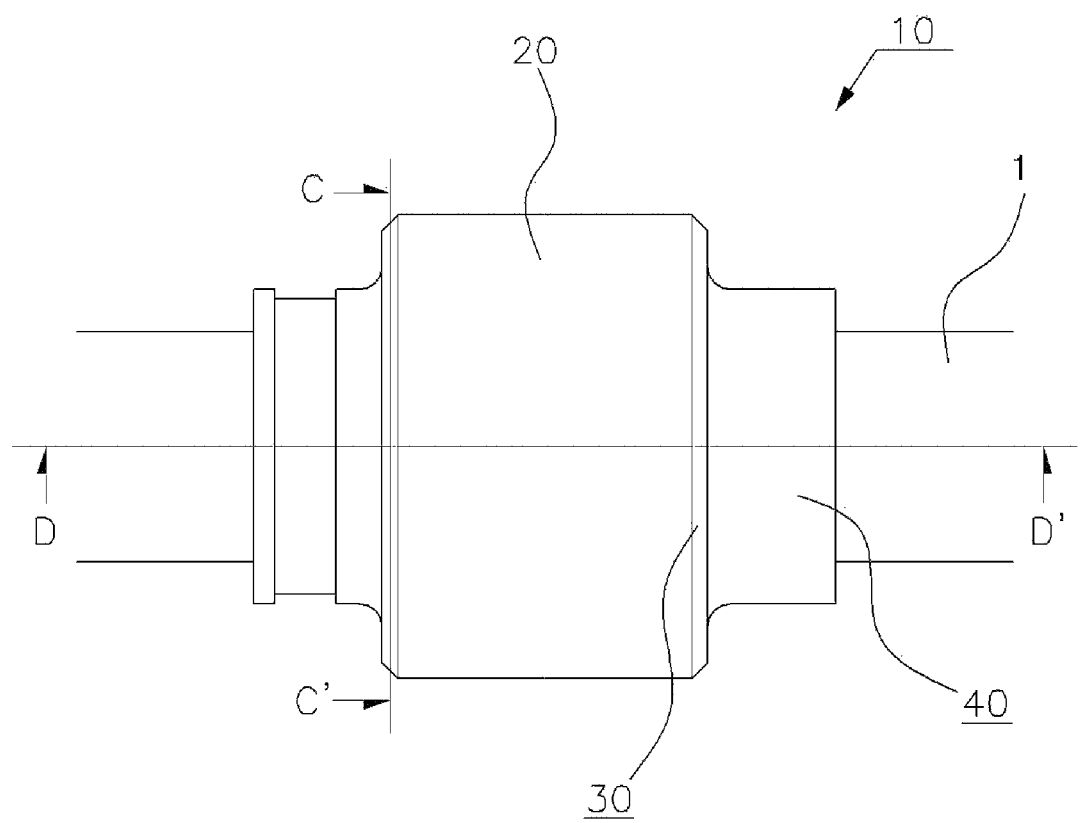
FIG. 4 is an exemplary side view of a dynamic damper according to an exemplary embodiment of the present invention.

Hereinafter, a configuration of a dynamic damper according to the present invention will be described in detail with reference to FIGS. 4 to 7. As shown, FIG. 4 is an exemplary side view of the dynamic damper according to an exemplary embodiment of the present invention. Further, FIG. 5 is an exemplary cross-sectional view of the dynamic damper according to an exemplary embodiment of the present invention, which is taken along line C-C' of FIG. 4.

First, referring to FIG. 4, a dynamic damper 10 according to the present invention may be coupled to (e.g., mounted on) a drive shaft 1, and may include a main body portion 20 configured to receive a mass member inserted therein. Further, connecting portions 40 may be formed at both ends into which the drive shaft 1 may be inserted. Additionally, bridge portions 30 may be formed between the main body portion 20 and the connecting portions 40. In particular, as illustrated in a longitudinal cross-sectional view of the bridge portion 30 that corresponds to a cross section of FIG. 5 taken along line C-C', the dynamic damper 10 may include a thickness of a circumferential surface of the bridge portion 30 that may vary for each portion. For example, the dynamic damper may include a continuous resonant frequency dependent on a temperature variation.

Figure 5:
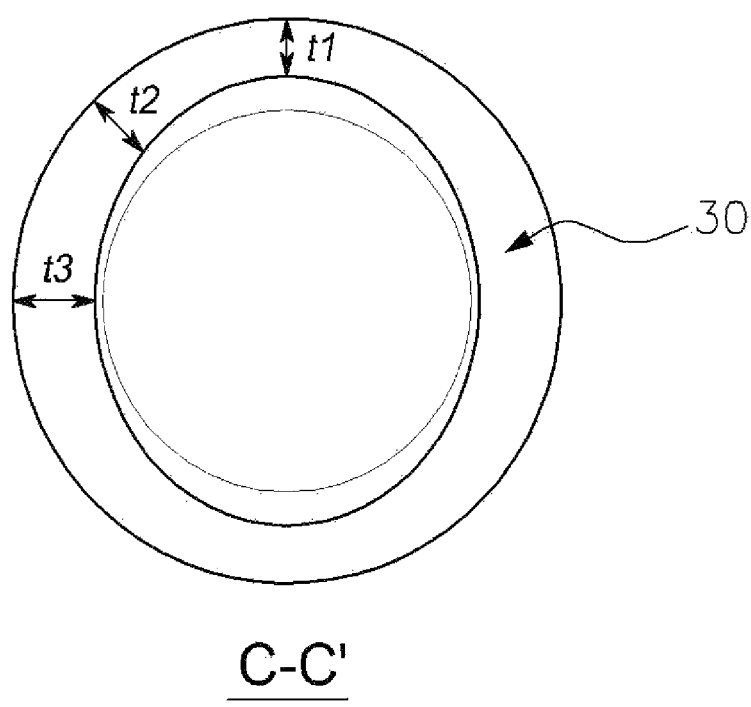
FIG. 5 is an exemplary cross-sectional view of the dynamic damper according to an exemplary embodiment of the present invention, which is taken along line C-C' of FIG. 4.

In other words, as illustrated in FIG. 5, a longitudinal section of the circumferential surface of the bridge portion 30 may be formed with the thicknesses of the cross section from an uppermost portion to a central portion of the bridge portion 30 have a first thickness t1 at the uppermost portion. Further, a second thickness t2 may be formed at an intermediate portion (e.g., an intermediate portion between the uppermost portion and the central portion), and a third thickness t3 may be formed at the central portion. In other words, the thicknesses of the bridge portion may be different (e.g., varied) for each portion, and the longitudinal section of the circumferential surface entirely has an elliptical shape.

Figure 6:
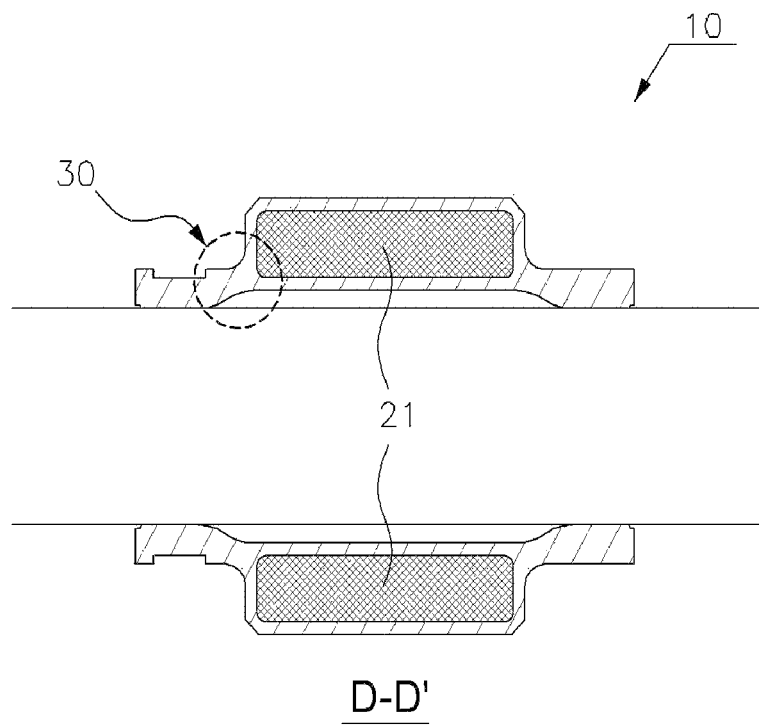
FIG. 6 is an exemplary cross-sectional view of the dynamic damper according to an exemplary embodiment of the present invention, which is taken along line D-D' of FIG. 4.
Figure 7:
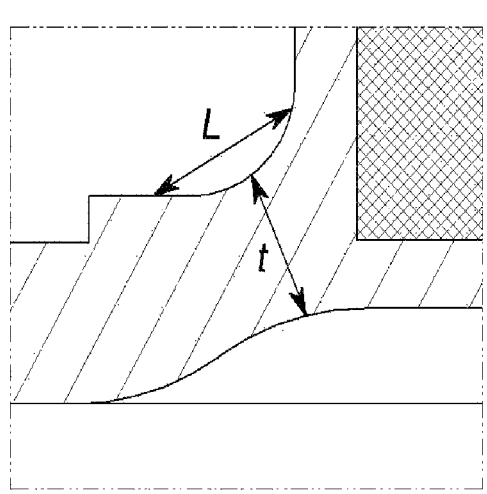
FIG. 7 is an exemplary detailed view of a bridge portion in FIG. 6 according to an exemplary embodiment of the present invention.

Furthermore, to exhibit a continuous resonant frequency dependent on a temperature variation using the dynamic damper as illustrated in FIG. 3, a resonant frequency (e.g., A Hz in FIG. 3) of the damper at a lowest temperature and a resonant frequency (e.g., B Hz in FIG. 3) of the damper at a highest temperature may be set within the corresponding temperature section. For example as shown in FIGS. 6 and 7, the damper may have a resonant frequency based on a rate of change in resonant frequency within a temperature variation section of the dynamic damper. The dynamic damper may be designed to include a resonant frequency dependent on a temperature at the periphery of the damper as described above. In particular, the dynamic damper solves a problem in the related art in that a resonant frequency of the dynamic damper is changed differently in accordance with a temperature variation. In other words, the varied adjustment of the dynamic damper in accordance with temperature limits the attenuation vibration applied to a drive shaft, thereby further maximizing an effect of attenuating vibration.

FIG. 6 is an exemplary cross-sectional view of the dynamic damper according to an exemplary embodiment, which is taken along line D-D' of FIG. 4. As shown, FIG. 7 is an exemplary detailed view of the bridge portion in FIG. 6. First, referring to a transverse section of the dynamic damper 10 in FIG. 6, the damper 10 may include the bridge portions 30 disposed between the main body 20 into which a mass body 21 having a steel ring shape may be inserted and the connecting portions 40 into which the drive shaft 1 may be inserted. For example, a resonant frequency f of the damper 10 may be determined by the following Equation.

$$f = \frac{1}{2\pi}\sqrt{\alpha\frac{t}{mL}} \qquad \text{Equation 1}$$

Wherein, f is a resonant frequency, α is a correction factor, m is a weight of the mass body, L is a length of the bridge portion, and t is a thickness of the bridge portion.

In particular, the correction factor in Equation 1 may be data provided by a manufacturer of the corresponding damper. As illustrated in the detailed view of the bridge portion in FIG. 7, the length L of the bridge portion may be a length disposed between the main body 20 and the connecting portion 40 into which the drive shaft 1 may be inserted. Further, as illustrated in FIG. 5, the thickness t of the bridge portion may include a thickness of the circumferential surface of the bridge portion.

Therefore, based on Equation 1, a continuous resonant frequency dependent to a temperature variation may be generated by continuously setting a resonant frequency within the corresponding temperature section by varying the thicknesses t of the bridge portion. Additionally, the attenuation effect of vibration applied to the drive shaft may be maximized. The thickness for each portion of the bridge portion 30 of the dynamic damper 10 may have a continuous resonant frequency between about 30 Hz and 60 Hz.

While the configuration of the dynamic damper for a drive shaft for a vehicle has been described above with reference exemplary embodiments thereof, it will be understood by those of ordinary skill in the art will appreciate that various various modifications additions and substitutions are possible, without departing from the scope and spirit of the invention as disclosed in the accompanying claims. The exemplary embodiments should be considered in a descriptive sense only and not for purposes of limitation.

What is claimed is:

1. A dynamic damper for a drive shaft for a vehicle, comprising:
a main body portion into which a mass body is inserted; and
a connecting portion into which a drive shaft is inserted,
wherein a bridge portion disposed between the main body portion and the connecting portion has a variation in thicknesses from an uppermost portion to a central portion thereof,
wherein the bridge portion thickness is a height of a longitudinal section of circumferential surface of the bridge portion, and
wherein a resonant frequency of the damper is determined by the following Equation 1, $$f = \frac{1}{2\pi}\sqrt{\alpha\frac{t}{mL}} \quad 1.42 \leq \alpha \leq 5.68, \ [\alpha] = \text{N/mm}^2 \qquad \text{Equation 1}$$

wherein f is a resonant frequency, α is a correction factor, m is a weight of mass body, L is a length of the bridge portion, and t is a thickness of the bridge portion,
characterized in that, a continuous resonant frequency dependent of a temperature variation of air surrounding the dynamic damper is generated by varying the thicknesses of the bridge portion.

2. The dynamic damper of claim 1, wherein the longitudinal section of the circumferential surface of the bridge portion has an elliptical shape.

3. The dynamic damper of claim 1, wherein by Equation 1, the continuous resonant frequency dependent of the temperature variation of the air is generated by continuously setting a resonant frequency within a predetermined temperature section by varying the thicknesses of the bridge portion.

4. The dynamic damper of claim 1, wherein a first thickness may be formed at the uppermost portion.

5. The dynamic damper of claim 1, wherein, a second thickness may be formed at an intermediate portion of the bridge portion.

6. The dynamic damper of claim 1, wherein, a third thickness may be formed at the central portion.

* * * * *